US008483197B2

(12) United States Patent
Abraham et al.

(10) Patent No.: US 8,483,197 B2
(45) Date of Patent: Jul. 9, 2013

(54) AP TO LEGACY STATION SDMA PROTOCOL

(75) Inventors: Santosh P. Abraham, San Diego, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 12/725,623

(22) Filed: Mar. 17, 2010

(65) Prior Publication Data

US 2010/0238850 A1    Sep. 23, 2010

Related U.S. Application Data

(60) Provisional application No. 61/162,576, filed on Mar. 23, 2009.

(51) Int. Cl.
*H04L 1/16* (2006.01)
*H04W 56/00* (2009.01)
*H04W 88/10* (2009.01)

(52) U.S. Cl.
USPC ............................. 370/338; 370/310; 455/503

(58) Field of Classification Search
USPC .......... 370/336, 338, 341, 350, 310; 455/502, 455/503
See application file for complete search history.

(56) References Cited

U.S. PATENT DOCUMENTS

| 6,801,514 B2 * | 10/2004 | Ma ............................... 370/339 |
| 2006/0109814 A1 * | 5/2006 | Kuzminskiy et al. ......... 370/329 |
| 2006/0221879 A1 | 10/2006 | Nakajima et al. |
| 2007/0153760 A1 * | 7/2007 | Shapira ........................ 370/350 |

FOREIGN PATENT DOCUMENTS

| JP | 2006287550 A | 10/2006 |
| JP | 2007208522 A | 8/2007 |
| WO | WO2007074452 | 7/2007 |

OTHER PUBLICATIONS

International Search Report and Written Opinion—PCT/US2010/028359, International Search Authority—European Patent Office—Jun. 23, 2010 (090259).
Joshua Wall et al: "Adaptive Multimedia Packet Transmission for Broadband IEEE 802.11 Wireless Lans" Personal, Indoor and Mobile Radio Communications, IEEE, PI, Jan. 9, 2006, pp. 1-5, XP031023437 ISBN:.978-1-4244-0329-5.
Kuzminskiy et al: "Downlink SDMA for IEEE 802.11A/ G: A Means for Improving Legacy Mobile Throughput Using a Multi- Antenna Access Point" Personal, Indoor and Mobile Radio Communications, IEEE LNKDD01: 10.1109/PIMRC. 2005.1651466, vol. 1, Nov. 9, 2005, pp. 397-401, XP010926383 ISBN:.978-978-38007-2-4.

* cited by examiner

*Primary Examiner* — Chi Pham
*Assistant Examiner* — Ahmed Elallam
(74) *Attorney, Agent, or Firm* — Dang M. Vo

(57) ABSTRACT

Certain aspects of the present disclosure provide a protocol for SDMA communication between an access point and multiple wireless apparatuses, such as single antenna stations.

20 Claims, 6 Drawing Sheets

AP TO LEGACY STATION SDMA PROTOCOL

CLAIM OF PRIORITY UNDER 35 U.S.C. §119

The present application for patent claims benefit of U.S. Provisional Patent Application No. 61/162,576 filed Mar. 23, 2009 assigned to the assignee hereof and hereby expressly incorporated by reference herein.

TECHNICAL FIELD

The present disclosure generally relates to communication, and more specifically to spatial division multiple access (SDMA) systems.

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems.

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S$ min$\{N_T, N_R\}$. The $N_S$ spatial streams may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S=\min\{N_T, \text{sum}(N_R)\}$, where sum($N_R$) represents the summation of all user terminal receive antennas. When SDMA is transmitted to an access point, $N_S=\min\{\text{sum}(N_T), N_R\}$, where sum($N_T$) represents the summation of all user terminal transmit antennas.

SUMMARY

Certain aspects provide a method for wireless communications. The method generally includes transmitting data packets to a plurality of wireless apparatuses, wherein the data packets are transmitted using spatial division multiple access (SDMA), receiving a signal from at least one of the stations in response to the data packets, and recognizing the signal as an acknowledgement of receipt of one or more of the data packets, regardless of whether the signal is correctly decoded.

Certain aspects provide an apparatus for simultaneous transmitting data to multiple wireless apparatuses in a wireless communications system. The apparatus generally includes a transmitter for transmitting data packets to a plurality of wireless apparatuses, wherein the data packets are transmitted using spatial division multiple access (SDMA) and a receiver for receiving a signal from at least one of the stations in response to the data packets and recognizing the signal as an acknowledgement of receipt of one or more of the data packets, regardless of whether the signal is correctly decoded.

Certain aspects provide an apparatus for simultaneous transmitting data to multiple wireless apparatuses in a wireless communications system. The apparatus generally includes means for transmitting data packets to a plurality of wireless apparatuses, wherein the data packets are transmitted using spatial division multiple access (SDMA), means for receiving a signal from at least one of the stations in response to the data packets, and means for recognizing the signal as an acknowledgement of receipt of one or more of the data packets, regardless of whether the signal is correctly decoded.

Certain aspects provide a computer-program product for communication, comprising a computer readable medium encoded with instructions. The instructions are executable to transmit data packets to a plurality of wireless apparatuses, wherein the data packets are transmitted using spatial division multiple access (SDMA), receive a signal from at least one of the stations in response to the data packets, and recognize the signal as an acknowledgement of receipt of one or more of the data packets, regardless of whether the signal is correctly decoded.

Certain aspects provide an access point for simultaneous transmitting data to multiple wireless stations in a wireless communications system. The access point generally includes a plurality of antennas, a transmitter for transmitting data packets to a plurality of wireless apparatuses, wherein the data packets are transmitted via at least two of the plurality of antennas using spatial division multiple access (SDMA), and a receiver for receiving, via at least two of the plurality of antennas, a signal from at least one of the stations in response to the data packets and recognizing the signal as an acknowledgement of receipt of one or more of the data packets, regardless of whether the signal is correctly decoded.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
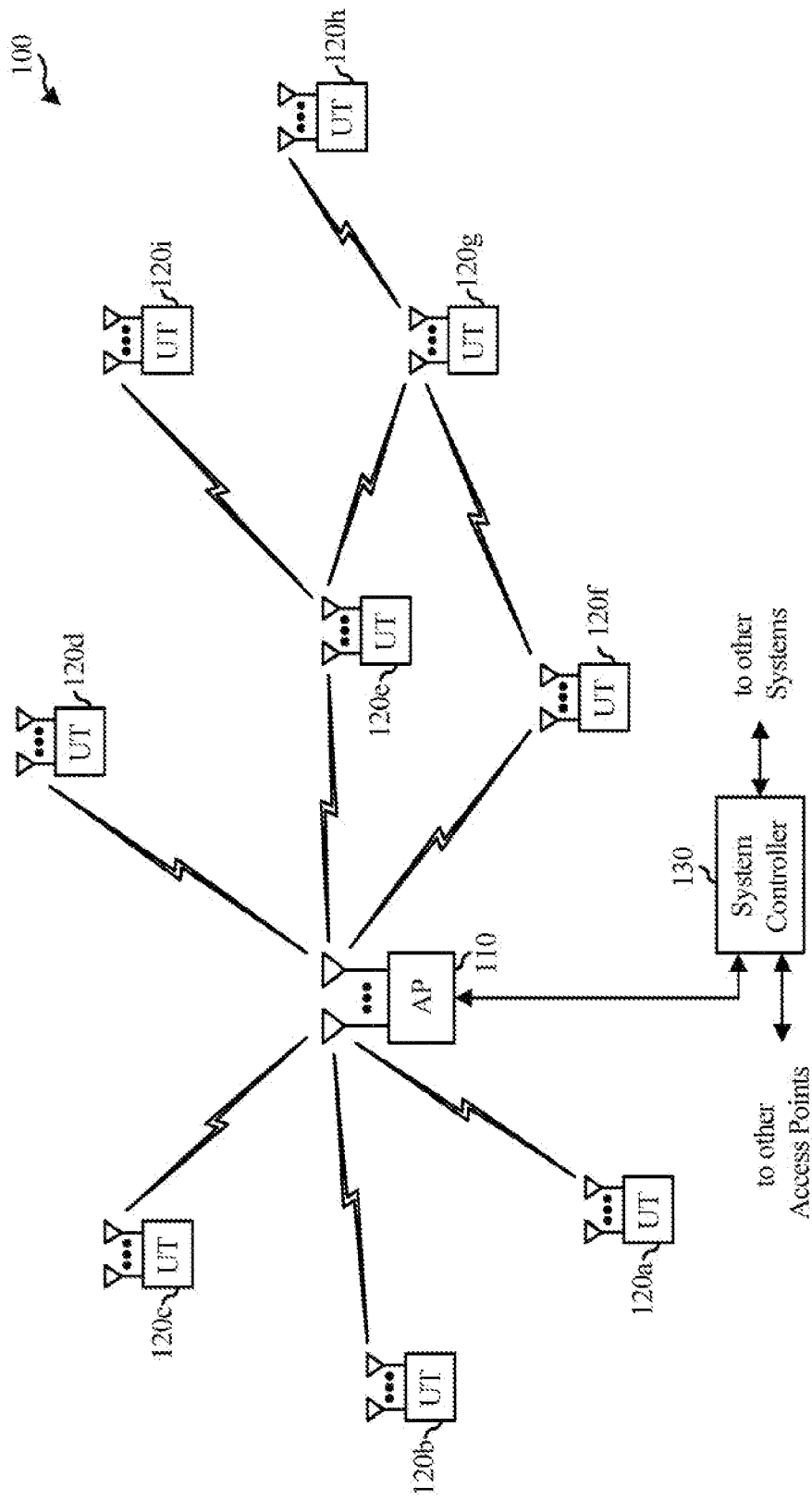
FIG. 1 illustrates a spatial division multiple access MIMO wireless system in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via spatial division multiple access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
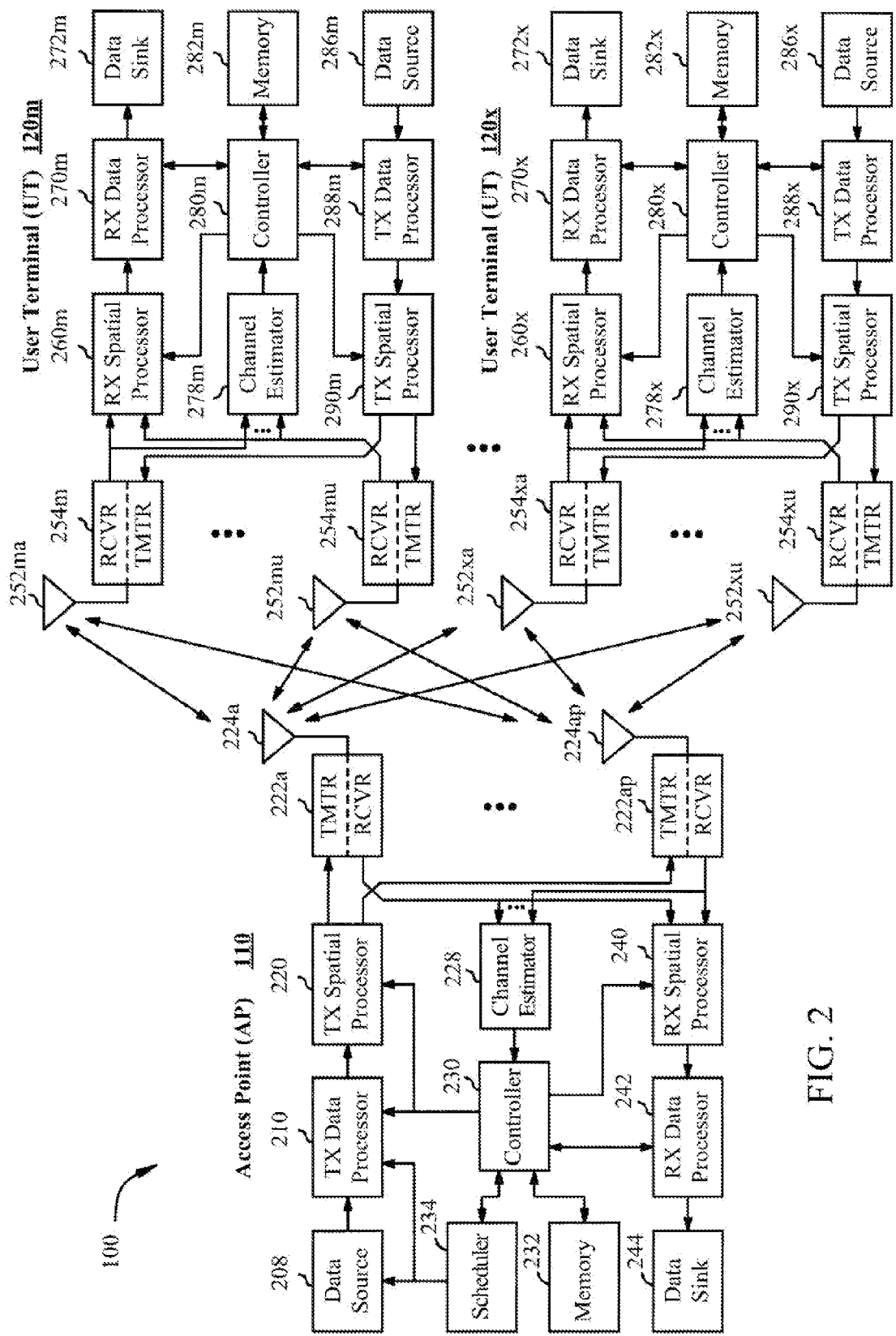
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
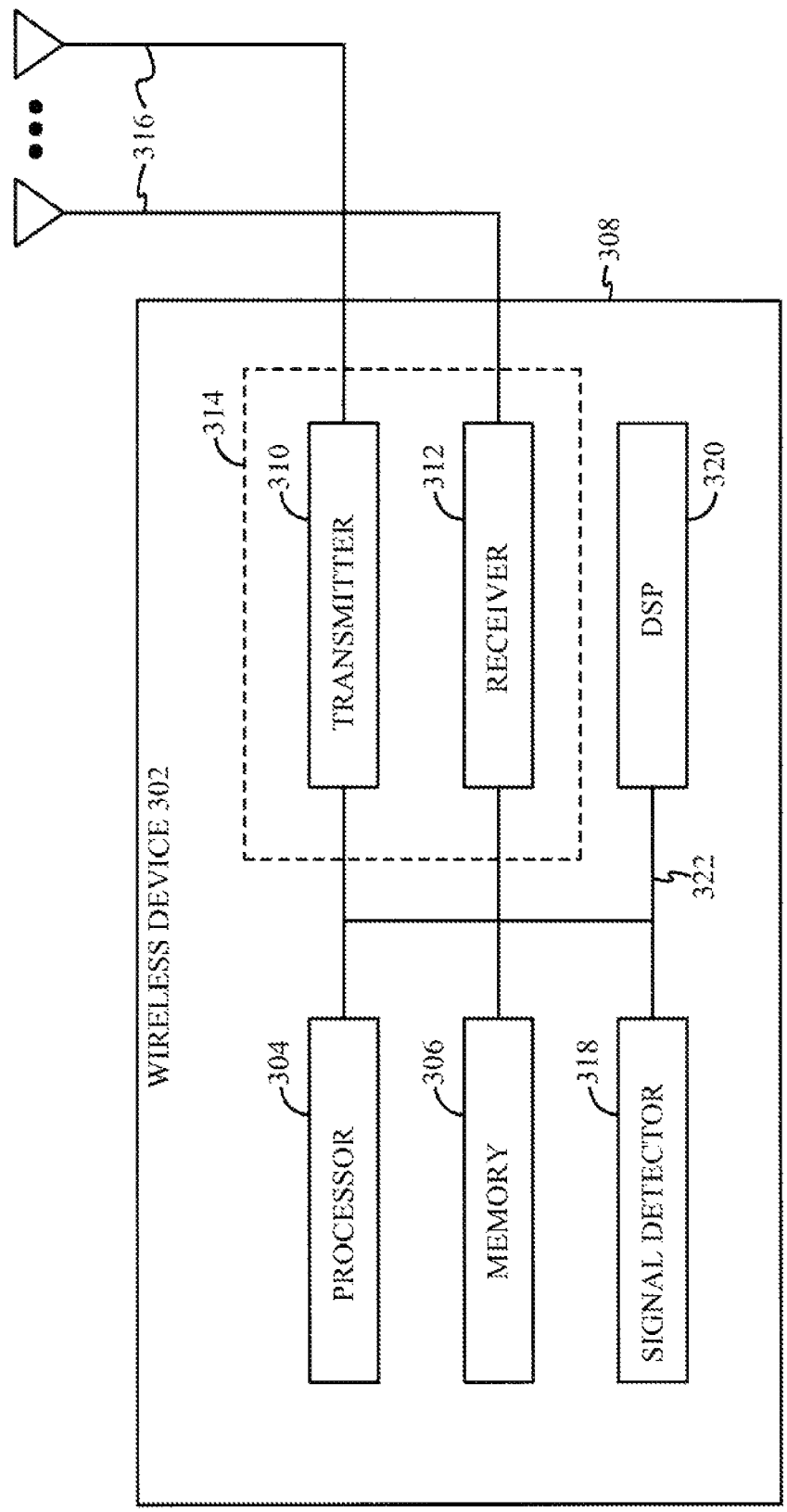
FIG. 3 illustrates example components of a wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

AP to Legacy Station SDMA Protocol

According to certain aspects, in a system utilizing multiple input multiple output (MIMO) technology, spatial division multiple access (SDMA) techniques may utilize parallel spatial links next to the higher capacity links through spatial multiplexing and/or diversity to provide superior performance. In a MIMO-SDMA system, the access point and at least some stations may contain multiple antennas. However, such systems may also include single antenna devices (e.g., legacy devices).

Certain aspects of the present disclosure provide a protocol that may allow an SDMA AP to communicate with single antenna stations. According to certain aspects, an AP may transmit SDMA signals to legacy devices, such as devices that utilize the Institute of Electrical and Electronics Engineers (IEEE) 802.11a/n family of standards. The techniques presented herein may help increase the capacity of a system and to achieve higher performance without modification to existing legacy devices.

According to certain aspects, an SDMA-enabled AP may transmit SDMA signals to multiple legacy stations. Because the legacy stations may have a single antenna, they may not be capable of actual directional SDMA transmissions to acknowledge the signals. Thus, acknowledgements sent from these stations to the AP may interfere with each other and, in some cases, the AP may not be able to decode them properly. However, the AP may recognize these signals as acknowledgements regardless of whether the signals are properly decoded as acknowledgement messages, (e.g., per a predefined format specified in a standard).

Figure 4:
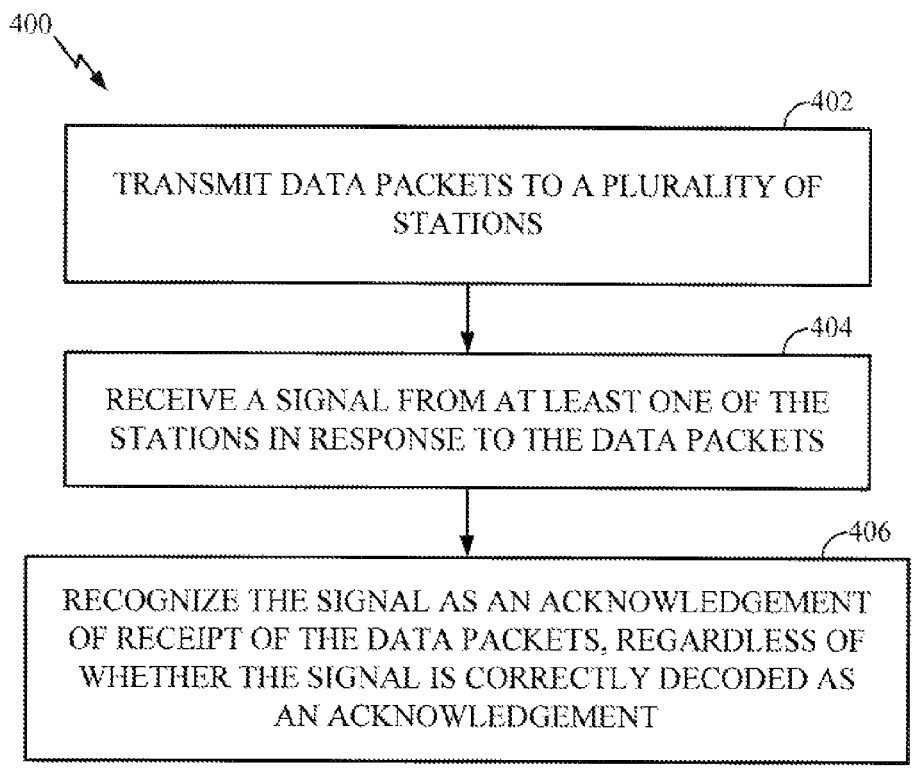
FIG. 4 illustrates example operations, in accordance with certain aspects of the present disclosure.

FIG. 4 illustrates example operations 400 for an SDMA communication protocol among an access point (AP) and legacy stations, in accordance with certain aspects of the present disclosure. The example operations may be performed, for example, by an AP capable of SDMA transmissions. According to certain aspects, the AP may communicate with a plurality of stations, including SDMA-enabled multi-antenna stations and non-SDMA single-antenna "legacy" stations.

At 402, an AP transmits data packets to a plurality of stations. According to certain aspects, the data packets may be transmitted using SDMA. According to certain aspects, the plurality of stations may include non-SDMA stations, as well as SDMA stations.

At 404, the AP receives a signal from at least one of the stations in response to the data packets. According to certain aspects, SDMA stations may be configured to transmit acknowledgement messages that contain information the AP should decode. For example, SDMA stations may send acknowledgements (e.g., block acknowledgements or BAs) that indicate (e.g., via a bitmap) which data packets have been successfully received. However, non-SDMA stations may send only a simple acknowledgement that does not contain useful information. Therefore, the AP may not need to actually successfully decode such acknowledgements.

At 406, the AP recognizes the signal as an acknowledgement of receipt of the data packets, regardless of whether the signal is correctly decoded as an acknowledgement. For example, the mere detection of a response signal may indicate the station received a corresponding data packet and the AP may recognize any response signal as an acknowledgement. Thus, the AP may be able to communicate with legacy stations using SDMA techniques, even if the responses from such stations cause interference that might prevent proper decoding of ACK messages.

According to certain aspects, in an effort to enhance communications using the techniques presented herein, an effort may be made to ensure that the "legacy" SDMA recipients meet certain conditions. For example, the SDMA recipients may be selected that have similar ranges and power requirements. Further, the SDMA recipients may be selected such that each of the STAs do not have any diversity and only have a single antenna. Further, STAs with similar packet lengths may be selected, such that the corresponding data packets may be more efficiently transmitted together using SDMA.

Figure 5A:
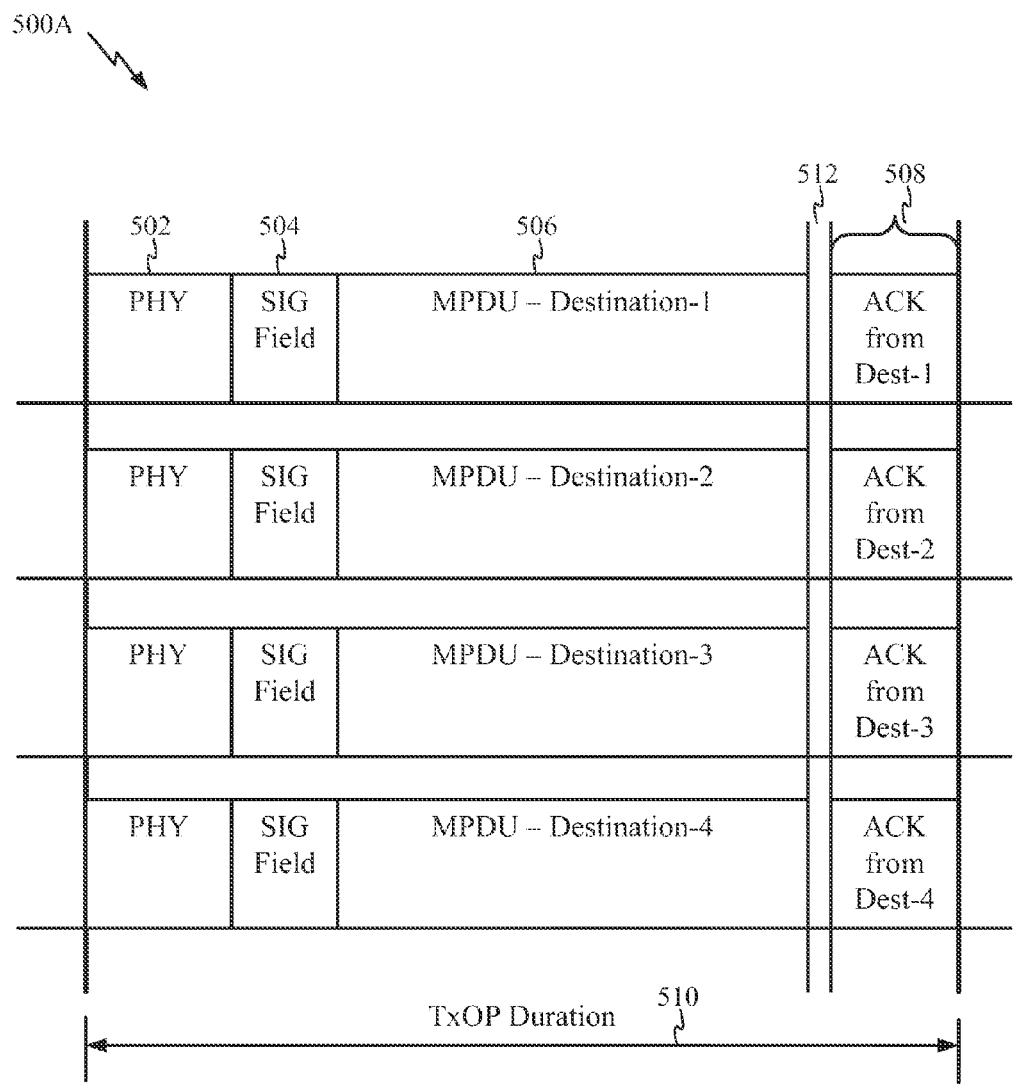
FIGS. 5A and 5B illustrate example spatial streams transmitted by an access point to a plurality of stations, in accordance with certain aspects of the present disclosure.

FIG. 5A illustrates an example message exchange using the techniques presented herein, in accordance with certain aspects of the present disclosure. As a non-limiting example, FIG. 5 illustrates four spatial streams transmitted by an access point to a plurality of legacy stations STA1-STA4 (e.g., that utilize IEEE 802.11a standard).

As illustrated, multiple spatial streams may be transmitted simultaneously from the physical layer 502 of an access point. Each of the streams may contain an SIG field 504 and a medium access control (MAC) packet data unit (MPDU), or aggregated MPDU (AMPDU) 506 for each of the destination stations. In response, after a SIFS duration 512, the stations may send an acknowledgement 508 message to the AP to acknowledge the receipt of a message from the AP. The above communications take place during a transmit opportunity (TxOP) 510.

Figure 5B:
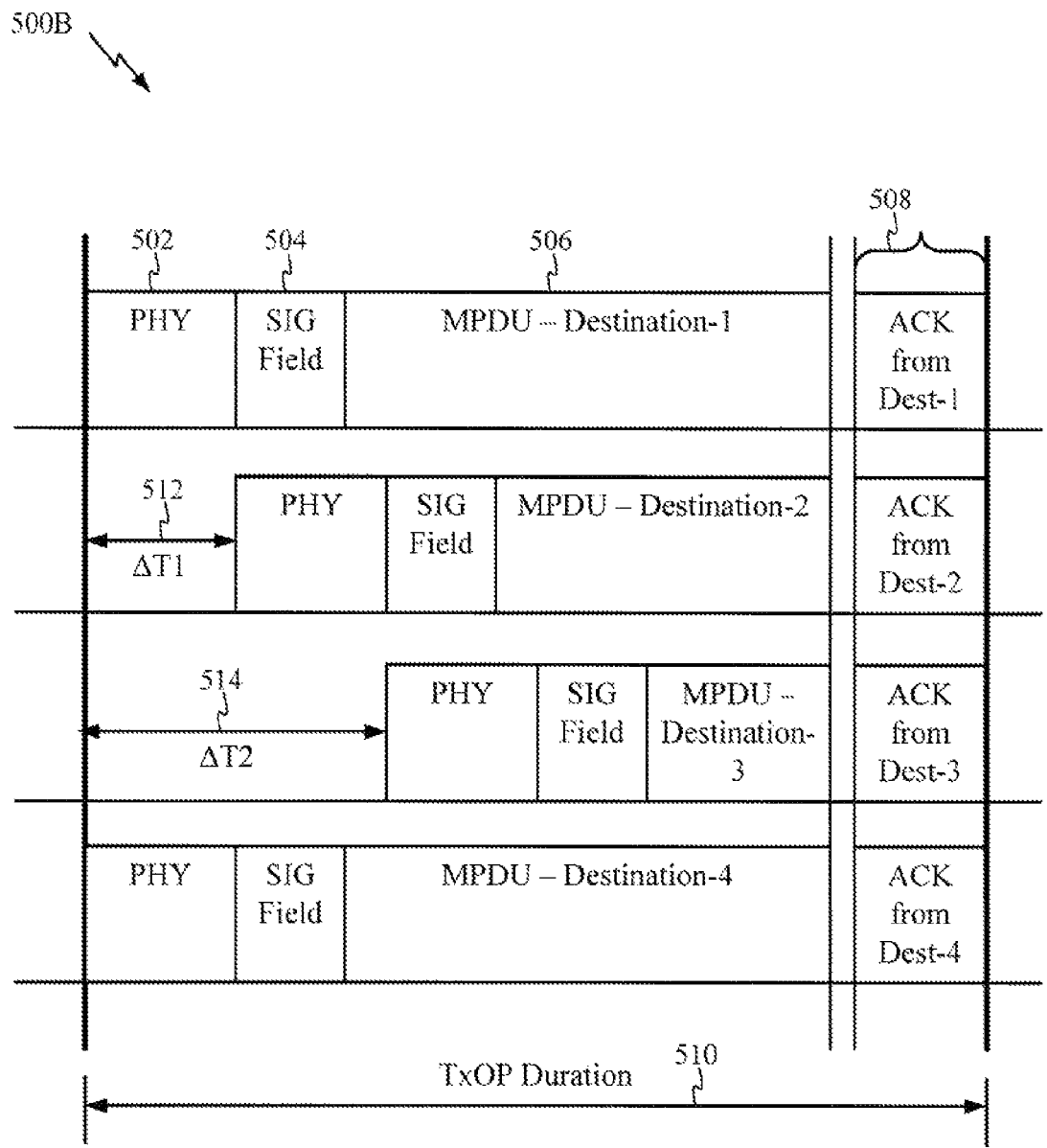

As illustrated in FIG. 5A, according to certain aspects, the duration of the packets transmitted to all the destinations stations may be the same. As illustrated in FIG. 5B, however, according to other aspects, the duration of each of the packets may not be the same. In general, the goal may be to have these packets end at the same time at all the destination stations. To accomplish this goal, since the packet durations are not the same, transmission of packets with shorter durations may be started some ("delta") time after transmission of the longest duration packet is started.

In the example shown in FIG. 5B, transmission of the (shorter) packets to STA2 and STA3 are delayed by ΔT1 512 and ΔT2 514, respectively, relative to the transmission of packets to STA1 and STA4, which take the full TxOP Duration 510. According to certain aspects, the AP (or some other scheduling apparatus) may be configured to compute the deltas and schedule the transmission start times of packets with different durations to multiple stations, in an effort to ensure the multiple packet transmissions end at the same time at each of the receiving stations.

According to certain aspects of the present disclosure, an access point (AP) may estimate the channel state information (CSI) for each of the single antenna STAs by receiving any packet (e.g., Management, Control, Action or Data). The AP may use this information to compute the pre-coding matrices to perform downlink SDMA transmissions.

As described above, the stations may send acknowledgement messages over the same stream as they received downlink information from the AP after some time equal to a short inter-frame space (SIFS) is passed from the downlink transmission. Simultaneous acknowledgement (ACK) messages from each of the SDMA recipients may be detected on their corresponding spatial streams.

Certain aspects of the present disclosure may increase performance of a system especially for the systems using TCP and VoIP streams that employ fixed packet lengths. VoIP may represent a suitable application, as such systems typically send packets of equal length to multiple clients. Further, the size of a transport connection protocol (TCP) packet is limited to 1500 bytes by the system Maximum Transferable Unit (MTU), which may also help increase performance using the techniques provided herein.

Thus, the stations may include any type of wireless device capable of supporting VoIP and/or TCP streams, such as mobile handsets, portable or laptop computers, and the like.

Figure 4A:
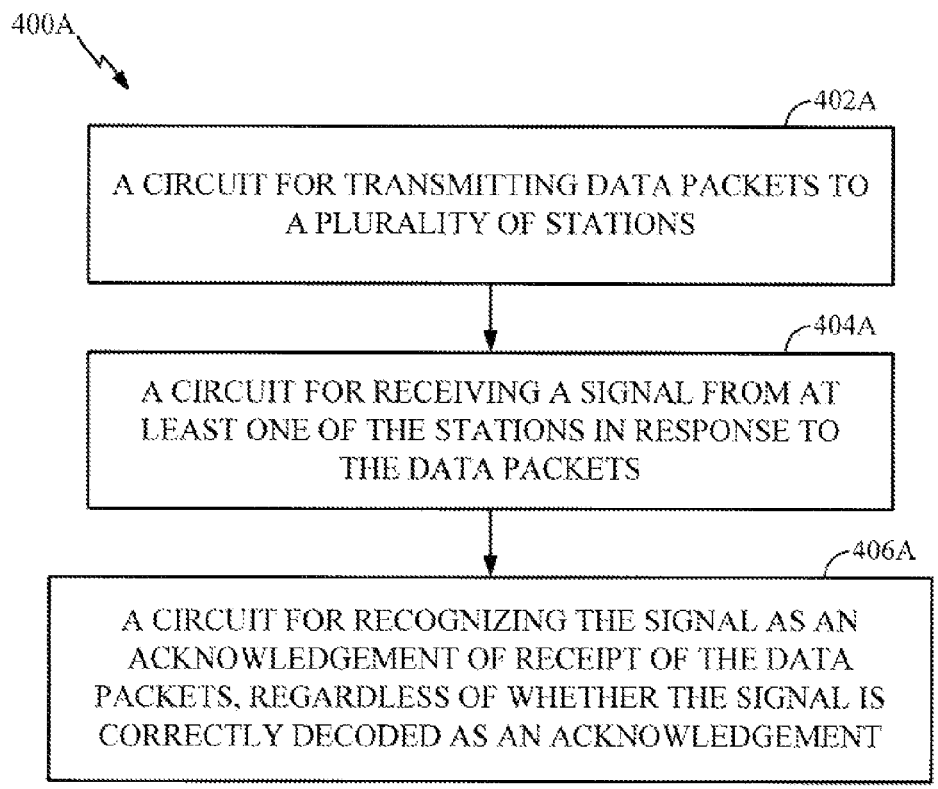
FIG. 4A illustrates example components capable of performing the operations shown in FIG. 4.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 402-406, illustrated in FIG. 4 correspond to circuit blocks 402A-406A, illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
transmitting data packets to a plurality of wireless apparatuses on a plurality of spatial streams, wherein the plurality of wireless apparatuses comprise at least one Spatial Division Multiple Access (SDMA) capable device and at least one non-SDMA capable device;
receiving a first signal from a first wireless apparatus on a first spatial stream in response to the data packets, wherein the first wireless apparatus is a non-SDMA capable device; and
recognizing the first signal as an acknowledgement of receipt of one or more of the data packets by the first wireless apparatus independent of whether the first signal is correctly decoded.

2. The method of claim 1, wherein:
at least two of the data packets are transmitted at different start times; and
the different start times are calculated such that transmission of each of the data packets terminates at substantially the same time.

3. The method of claim 1, wherein the transmission comprises:
selecting at least two different data rates for transmissions to different wireless apparatuses.

4. The method of claim 3, wherein the different data rates are selected to equalize transmit times of data packets to the different wireless apparatuses.

5. The method of claim 1, wherein:
the plurality of wireless apparatuses comprise at least one wireless apparatus having a single antenna.

6. The method of claim 1, wherein:
the plurality of wireless apparatuses comprise at least one wireless apparatus having multiple antennas.

7. An apparatus for simultaneous transmitting data to multiple wireless apparatuses in a wireless communications system, comprising:
a transmitter configured to transmit data packets to a plurality of wireless apparatuses on a plurality of spatial streams, wherein the plurality of wireless apparatuses comprise at least one Spatial Division Multiple Access (SDMA) capable device and at least one non-SDMA capable device; and
a receiver configured to receive a first signal from a first wireless apparatus on a first spatial stream in response to the data packets and recognize the first signal as an acknowledgement of receipt of one or more of the data packets by the first wireless apparatus independent of whether the first signal is correctly decoded, wherein the first wireless apparatus is a non-SDMA capable device.

8. The apparatus of claim 7, wherein:
the transmitter is configured to transmit at least two of the data packets at different start times; and
the different start times are calculated such that transmission of each of the data packets terminates at substantially the same time.

9. The apparatus of claim 7, wherein the transmitter is configured to select at least two different data rates for transmissions to different wireless apparatuses.

10. The apparatus of claim 9, wherein the different data rates are selected to equalize transmit times of data packets to the different wireless apparatuses.

11. The apparatus of claim 7, wherein:
the plurality of wireless apparatuses comprise at least one wireless apparatus having a single antenna.

12. The apparatus of claim 7, wherein:
the plurality of wireless apparatuses comprise at least one wireless apparatus having multiple antennas.

13. An apparatus for simultaneous transmitting data to multiple wireless apparatuses in a wireless communications system, comprising:
means for transmitting data packets to a plurality of wireless apparatuses on a plurality of spatial streams, wherein the plurality of wireless apparatuses comprise at least one Spatial Division Multiple Access (SDMA) capable device and at least one non-SDMA capable device;
means for receiving a first signal from a first wireless apparatus on a first spatial stream in response to the data packets, wherein the first wireless apparatus is a non-SDMA capable device; and
means for recognizing the first signal as an acknowledgement of receipt of one or more of the data packets by the first wireless apparatus independent of whether the first signal is correctly decoded.

14. The apparatus of claim 13, wherein:
the means for transmitting is configured to transmit at least two of the data packets at different start times; and
the different start times are calculated such that transmission of each of the data packets terminates at substantially the same time.

15. The apparatus of claim 13, wherein the means for transmitting is configured to select at least two different data rates for transmissions to different wireless apparatuses.

16. The apparatus of claim 15, wherein the different data rates are selected to equalize transmit times of data packets to the different wireless apparatuses.

17. The apparatus of claim 15, wherein:
the plurality of wireless apparatuses comprise at least one wireless apparatus having a single antenna.

18. The apparatus of claim 15, wherein:
the plurality of wireless apparatuses comprise at least one wireless apparatus having multiple antennas.

19. A computer-program product for communication, comprising a computer readable device encoded with instructions executable to:
transmit data packets to a plurality of wireless apparatuses on a plurality of spatial streams, wherein the plurality of wireless apparatuses comprise at least one Spatial Division Multiple Access (SDMA) capable device and at least one non-SDMA capable device;
receive a first signal from a first wireless apparatus on a first spatial stream in response to the data packets, wherein the first wireless apparatus is a non-SDMA capable device; and
recognize the first signal as an acknowledgement of receipt of one or more of the data packets by the first wireless apparatus independent of whether the first signal is correctly decoded.

20. An access point, comprising:
a plurality of antennas;
a transmitter configured to transmit data packets to a plurality of wireless apparatuses on a plurality of spatial streams, wherein the plurality of wireless apparatuses comprise at least one Spatial Division Multiple Access (SDMA) capable device and at least one non-SDMA capable device; and
a receiver configured to receive, via at least two of the plurality of antennas, a first signal from a first wireless apparatus on a first spatial stream in response to the data packets and recognize the first signal as an acknowledgement of receipt of one or more of the data packets by the first wireless apparatus independent of whether the first signal is correctly decoded, wherein the first wireless apparatus is a non-SDMA capable device.

* * * * *